(12) United States Patent
Faieta et al.

(10) Patent No.: US 9,183,386 B2
(45) Date of Patent: Nov. 10, 2015

(54) WINDOWS REGISTRY MODIFICATION VERIFICATION

(71) Applicant: McAfee, Inc., Santa Clara, CA (US)

(72) Inventors: Alessandro Faieta, Kitchener (CA); Jameson Beach, Guelph (CA); Douglas Bell, Kitchener (CA)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/628,607

(22) Filed: Sep. 27, 2012

(65) Prior Publication Data
US 2013/0024941 A1    Jan. 24, 2013

Related U.S. Application Data

(63) Continuation of application No. 11/987,088, filed on Nov. 27, 2007, now Pat. No. 8,291,493.

(51) Int. Cl.
| | |
|---|---|
| *G06F 21/00* | (2013.01) |
| *G06F 21/55* | (2013.01) |
| *G06F 21/57* | (2013.01) |
| *G06F 21/56* | (2013.01) |

(52) U.S. Cl.
CPC .............. *G06F 21/554* (2013.01); *G06F 21/56* (2013.01); *G06F 21/57* (2013.01)

(58) Field of Classification Search
CPC ........ G06F 21/554; G06F 21/57; G06F 21/56
USPC .......................................................... 726/24
See application file for complete search history.

(56) References Cited

U.S. PATENT DOCUMENTS

| | | |
|---|---|---|
| 5,987,610 A | 11/1999 | Franczek et al. |
| 6,073,142 A | 6/2000 | Geiger et al. |
| 6,263,348 B1 * | 7/2001 | Kathrow et al. ..................... 1/1 |
| 6,460,050 B1 | 10/2002 | Pace et al. |
| 6,973,577 B1 | 12/2005 | Kouznetsov |
| 7,107,366 B2 | 9/2006 | Cheng et al. |
| 7,506,155 B1 | 3/2009 | Stewart et al. |
| 7,797,332 B1 | 9/2010 | Bove et al. |
| 7,841,863 B2 | 11/2010 | Mathieu et al. |

(Continued)

OTHER PUBLICATIONS

USPTO Aug. 29, 2011 Non-Final Office Action from U.S. Appl. No. 11/987,088.

(Continued)

*Primary Examiner* — Gilberto Barron, Jr.
*Assistant Examiner* — Devin Almeida
(74) *Attorney, Agent, or Firm* — Patent Capital Group

(57) ABSTRACT

A method and system is provided by which unauthorized changes to the registry may be detected and that provides the capability to verify whether registry, or other system configuration data, changes that occur on a computer system are undesirable or related to possible malware attack before the changes become effective or are saved on the system. A method for verifying changes to system configuration data in a computer system comprises generating an identifier representing an entry in the system configuration data, packaging the identifier, and sending the packaged identifier to a client for verification. The identifier may be generated by hashing the first portion of the entry and the second portion of the entry to generate the identifier, or by filtering the first portion of the entry and hashing the filtered first portion of the entry and the second portion of the entry to generate the identifier.

20 Claims, 7 Drawing Sheets

(56) References Cited

U.S. PATENT DOCUMENTS

| | | |
|---|---|---|
| 7,870,387 B1 | 1/2011 | Bhargava et al. |
| 7,975,298 B1 | 7/2011 | Venkatasubrahmanyam |
| 2006/0253458 A1 | 11/2006 | Dixon et al. |
| 2007/0101435 A1* | 5/2007 | Konanka et al. ............... 726/27 |
| 2007/0124308 A1 | 5/2007 | Johnson et al. |
| 2008/0127352 A1 | 5/2008 | Wang |
| 2008/0282338 A1 | 11/2008 | Beer |
| 2009/0077664 A1 | 3/2009 | Hsu et al. |
| 2009/0138967 A1 | 5/2009 | Faieta et al. |
| 2011/0093950 A1 | 4/2011 | Bhargava et al. |

OTHER PUBLICATIONS

USPTO Nov. 29, 2011 Response to Aug. 29, 2011 Non-Final Office Action from U.S. Appl. No. 11/987,088.

USPTO Dec. 12, 2011 Final Office Action from U.S. Appl. No. 11/987,088.

USPTO Feb. 13, 2012 RCE Response to Dec. 12, 2011 Final Office Action from U.S. Appl. No. 11/987,088.

USPTO Apr. 10, 2012 Nonfinal Office Action from U.S. Appl. No. 11/987,088.

USPTO Jun. 11, 2012 Response to Apr. 10, 2012 Nonfinal Office Action from U.S. Appl. No. 11/987,088.

USPTO Jun. 21, 2012 Notice of Allowance from U.S. Appl. No. 11/987,088.

\* cited by examiner

WINDOWS REGISTRY MODIFICATION VERIFICATION

RELATED APPLICATION

This patent application is a continuation (and claims the benefit of priority under 35 U.S.C. §120) of U.S. application Ser. No. 11/987,088, filed Nov. 27, 2007, entitled, "WINDOWS REGISTRY MODIFICATION VERIFICATION." The disclosure of the prior application is considered part of (and is incorporated by reference in) the disclosure of this application.

BACKGROUND OF THE INVENTION

1. Field of the Invention

The present invention relates to a method and system for verifying whether system configuration data changes that occur on a computer system are undesirable or related to possible malware attack before the changes become effective or are saved on the system.

2. Description of the Related Art

Computer software, such as operating systems and applications, typically uses configuration data to control the start-up and operational behavior of the software. For example, in the MICROSOFT WINDOWS® operating system, such configuration data is stored in a data structure known as the WINDOWS® registry. The registry is a data structure that contains information and settings for all the hardware and operating system software, as well as information and settings for most non-operating system software, users, preferences of the PC, etc.

In addition to reading information from a registry, software can modify the registry. Such actions may include creating new keys and/or values, modifying existing keys and/or values, and deleting keys and/or values. Legitimate software programs may modify the registry, but malware programs may also modify the registry. A typical computer malware is a program or piece of code that is loaded onto a computer and/or performs some undesired actions on a computer without the knowledge or consent of the computer operator.

In order to combat such computer malware, anti-malware software, such as anti-virus software may be used. One important function of such anti-malware software is to prevent unauthorized changes to the registry, so as to prevent malware from modifying the registry. As there are typically thousands of registry entries and thousands of malware programs, verifying changes to the registry is a large task, requiring significant storage and computing resources. A need arises for a technique by which unauthorized changes to the registry may be detected, but which uses system resources efficiently.

SUMMARY OF THE INVENTION

The present invention provides a method and system by which unauthorized changes to the registry may be detected, but which uses system resources efficiently. The present invention provides the capability to verify whether registry, or other system configuration data, changes that occur on a computer system are undesirable or related to possible malware attack before the changes become effective or are saved on the system. The present invention generates identifiers based on registry entries; packages these identifiers and sends them to client software, such as anti-malware software, that can process the identifiers. The identifiers are generated from the registry entries using an algorithm, such as a hashing algorithm. The identifiers are collected into a package, which is sent to a client for processing. The client is a software program that understands the format the entry, identifier and package.

A method for verifying changes to system configuration data in a computer system comprises generating an identifier representing an entry in the system configuration data, packaging the identifier, and sending the packaged identifier to a client for verification. The entry in the system configuration data may comprise a first portion identifying the entry and a second portion including a value of the entry and the identifier may be generated by hashing the first portion of the entry and the second portion of the entry to generate the identifier, or by filtering the first portion of the entry and hashing the filtered first portion of the entry and the second portion of the entry to generate the identifier.

The system configuration data may comprise a MICROSOFT WINDOWS® registry. The entry in the MICROSOFT WINDOWS® registry may comprise a key and a value and the identifier may be generated by hashing the key and the value to generate the identifier, or by filtering the key and hashing the filtered key and the value to generate the identifier.

A method for verifying changes to system configuration data, the system configuration data comprising a plurality of entries, in a computer system comprises, for each of at least a portion of the plurality of entries, generating an identifier representing the entry, packaging the identifiers, and sending the packaged identifiers to a client for verification. An entry in the system configuration data may comprise a first portion identifying the entry and a second portion including a value of the entry and an identifier may be generated by hashing the first portion of the entry and the second portion of the entry to generate the identifier, filtering the first portion of the entry and hashing the filtered first portion of the entry and the second portion of the entry to generate the identifier, or hashing the portion of the plurality of entries to generate the identifier.

The system configuration data may comprise a MICROSOFT WINDOWS® registry. The entry in the MICROSOFT WINDOWS® registry may comprise a key and a value and the identifier may be generated by hashing the key and the value to generate the identifier, filtering the key and hashing the key and the value to generate the identifier, or hashing the portion of the plurality of entries to generate the identifier.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Computer software, such as operating systems and applications, typically uses configuration data to control the startup and operational behavior of the software. For example, in the MICROSOFT WINDOWS® operating system, such configuration data is stored in a data structure known as the WINDOWS® registry. The registry is a data structure that contains information and settings for all the hardware and operating system software, as well as information and settings for most non-operating system software, users, preferences of the PC, etc. Examples of information and settings that are reflected and stored in the registry include Control Panel settings, file associations, system policies, installed software, etc. The registry also provides a window into the operation of the kernel, exposing runtime information such as performance counters and currently active hardware.

Other operating systems also store similar information, but typically use somewhat different data structures, such as separate configuration files for separate application subsystems.

Figure 1:
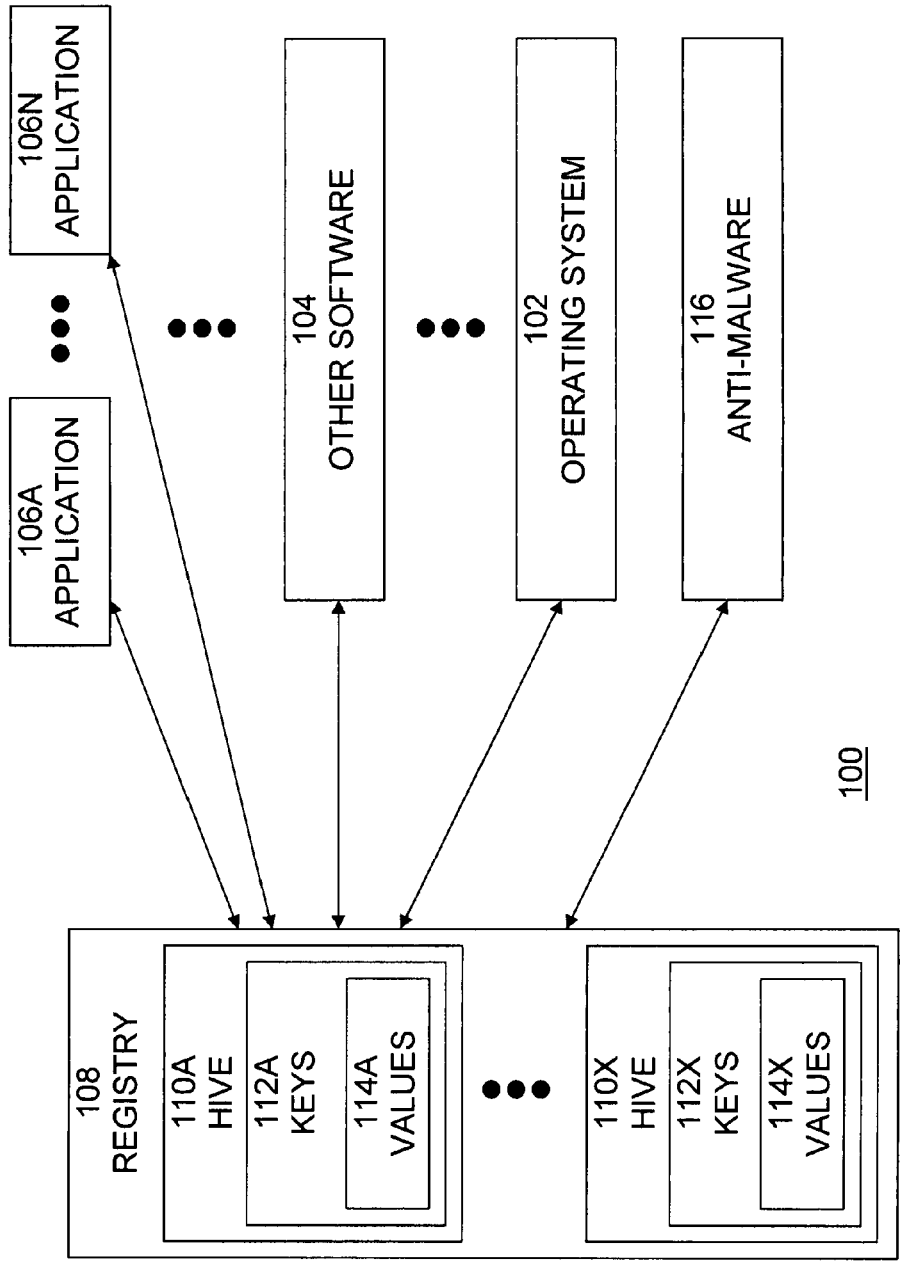
FIG. 1 is an exemplary block diagram of a software system, in which the present invention may be implemented.

A software system 100 in which the present invention may be implemented is shown in FIG. 1. The system shown in FIG. 1 is an example of the MICROSOFT WINDOWS® operating system. However, this is merely an example, as the present invention contemplates application to any and all operating systems, application programs, and other software.

System 100 includes operating system 102, intermediate software 104, applications 106A-N, and registry 108. An operating system (OS), such as operating system 102, is the software that manages the sharing of the resources of a computer. An operating system processes system data and user input, and responds by allocating and managing tasks and internal system resources as a service to users and programs of the system. At the foundation of all system software, an operating system performs basic tasks such as controlling and allocating memory, prioritizing system requests, controlling input and output devices, facilitating networking and managing file systems. Although in this example, the operating system is MICROSOFT WINDOWS®, other operating systems may be used, such as UNIX®, LINUX®, MAC OS®, etc.

Applications 106A-N are computer software that employs the capabilities of a computer to a task that the user wishes to perform. Typical examples of software applications are word processors, spreadsheets, and media players. Other software 104 includes software other than applications and the operating system and may be intermediate between the applications 106A-N and operating system 102 (as shown), or may operate in conjunction with or next to applications 106A-N and operating system 102 (not shown).

Registry 108 a data structure that contains information and settings for all the hardware and operating system software, as well as information and settings for most non-operating system software, users, preferences of the PC, etc. In this example, since the operating system 102 is MICROSOFT WINDOWS®, the registry structure that will be described is the MICROSOFT WINDOWS® registry. However, the present invention is applicable to any type of system configuration data of any operating system.

The registry 108 is split into a number of logical sections or hives 110A-X. The hives 110A-X are divided based on the type of information stored in each hive. For example, one hive may store information about registered applications, another may store settings that are specific to the currently logged-in user, another may store settings that are general to all users on the computer, and so on. Each registry hive 110A-X contains two basic types of data storage elements—keys and values. For example, hive 110A contains keys 112A and values 114A, while hive 110X contains keys 112X and values 114X. Registry Keys are similar to folders—in addition to values, each key can contain subkeys (not shown), which may contain further subkeys, and so on. Registry Values are name/data pairs stored within keys. Registry Values store the actual information and settings that are used by the software, including operating system 102, other software 104 and applications 106A-N.

A registry entry is a key/value pair including the full registry entry path and data value. Together, the key and value describe, a unique setting that may be used by the computer system. An entry includes a registry root and full path and/or value name with value data type and value data.

For example, there may be a registry key such as "HKEY_LOCAL_MACHINE\Software\McAfee\". The portion "HKEY_LOCAL_MACHINE" represents the registry root, while the portion :Software\McAfee\" represents the full path. As another example, there may be a registry key such as "HKEY_LOCAL_MACHINE\Software\ McAfee\"SettingName", REG_STRING, "SettingData"". In this example, "HKEY_LOCAL_MACHINE" represents the registry root, "Software\McAfee\" represents the full path, "SettingName" represents the value name, "REG_STRING" represents the value data type, and "SettingData" represents the value data.

In addition to reading information from registry 108, software can modify registry 108. Such actions may include creating new keys and/or values, modifying existing keys and/or values, and deleting keys and/or values. Legitimate software programs may modify registry 108, but malware programs may also modify registry 108. A typical computer malware is a program or piece of code that is loaded onto a computer and/or performs some undesired actions on a computer without the knowledge or consent of the computer operator. Types of malware include computer viruses, Trojan horse programs, and other content. Some widespread, well-known and dangerous types of computer malware include computer viruses, which are programs or pieces of code that loaded onto a computer without the user's knowledge and may proliferate further and/or damage the computer or other computers, and computer worms, which are programs or pieces of code that replicates themselves over a computer network and usually perform malicious actions.

A particular type of computer virus is the computer worm, which is a program or code that replicates itself over a computer network and may perform malicious actions, such as using up the computer's resources and possibly shutting the system down. A Trojan horse program is typically a destructive program that masquerades as a benign application. Unlike a virus, Trojan horses do not replicate themselves but they can be just as destructive. One insidious type of Trojan horse is a program that claims to rid a computer of malwares but instead introduces malwares onto the computer. Although terms such as virus or anti-virus may be used for clarity, such terms are used only as example of malwares and the present invention contemplates any and all types of malware, including, but not limited to computer viruses, computer worms, Trojan horse programs.

Anti-malware software 116 may be used to detect and remove such viruses and other malware. In order to detect a virus or other malicious program, an anti-malware program 116 typically scans data, such as files and/or the registry, which are stored on disk in a computer system and/or data that is being transferred or downloaded to a computer system and compares the data being scanned with profiles that identify various kinds of malware. The anti-virus program may then take corrective action, such as notifying a user or administrator of the computer system of the virus, isolating the file or data, deleting the file or data, etc.

Figure 2:
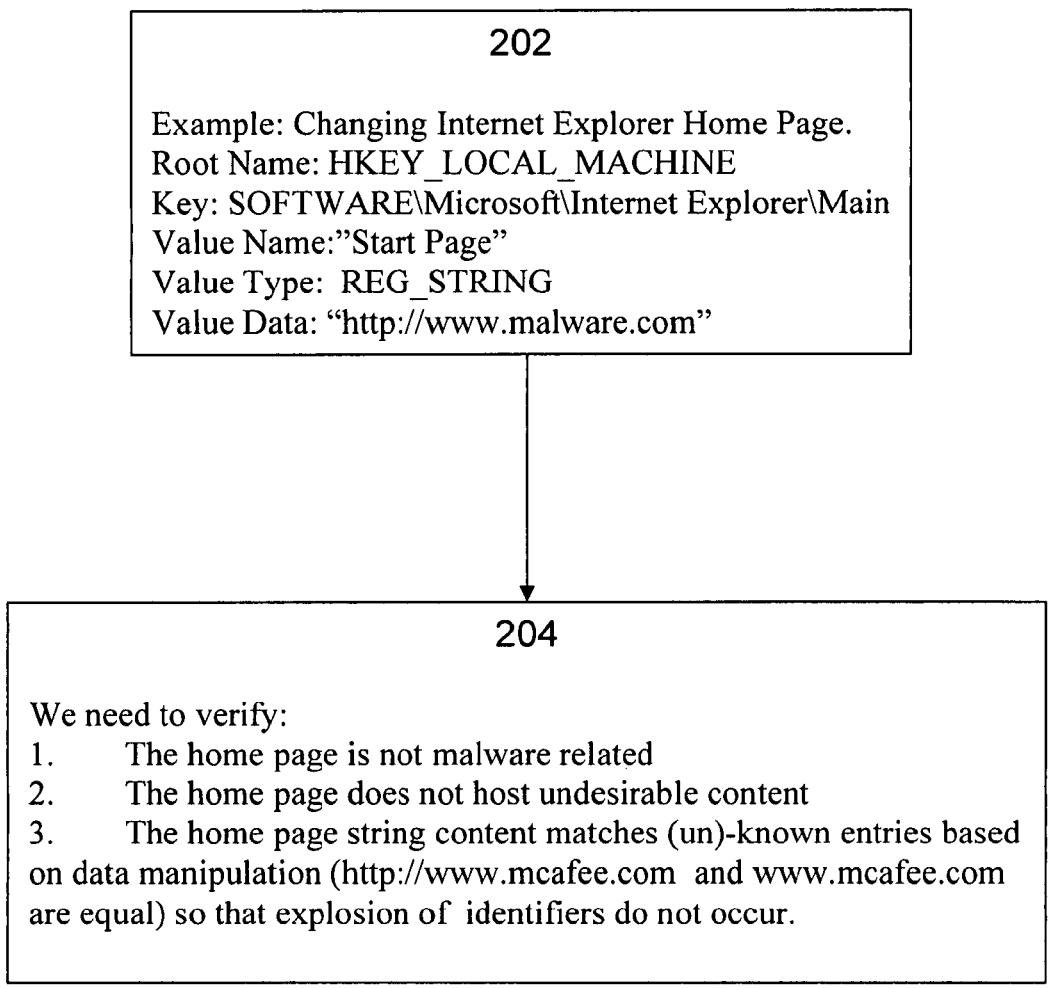
FIG. 2 is an exemplary flow diagram of a process of changing a registry entry.

The present invention provides the capability to verify whether registry, or other system configuration data, changes that occur on a computer system are undesirable or related to possible malware attack before the changes become effective or are saved on the system. An example of such a registry change is shown in FIG. 2. In step 202, a change to the INTERNET EXPLORER® home page is attempted. In this example, the attempted change requires writing the data "http://www.malware.com" into the Value named "Start Page", which is located in the Key named "SOFTWARE\Microsoft\Internet Explorer\Main", which is in the registry hive named "HKEY_LOCAL_MACHINE". Before the attempted change should be allowed, in step 204, several facts should be verified. In this example, it should be verified whether the specified home page is malware related, whether the specified home page hosts undesirable content, and whether the specified home page matches entries in a data base of known, or unknown, web pages.

Figure 3:
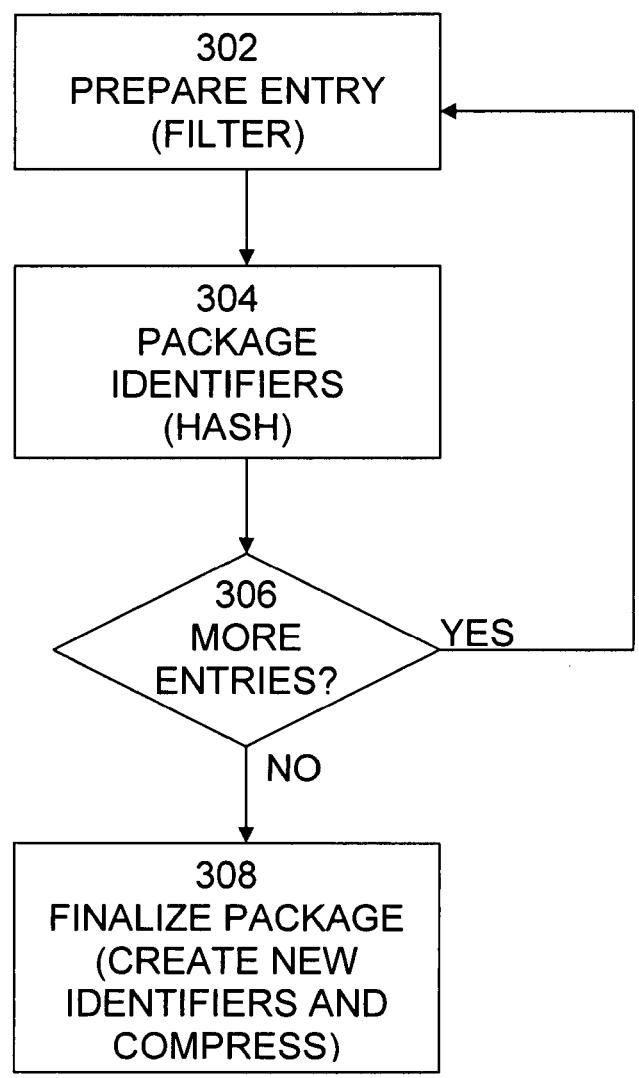
FIG. 3 is an exemplary flow diagram of a process of generating identifiers that may indicate attempted changes to registry entries.

The present invention generates identifiers based on registry entries; packages these identifiers and sends them to client software, such as anti-malware software 116, shown in FIG. 1, that can process the identifiers. The identifiers are generated from the registry entries using an algorithm, such as a hashing algorithm. The identifiers are collected into a package, which is sent to a client for processing. The client is a software program that understands the format of the entry, identifier and package. This processing is shown in more detail in FIG. 3, which illustrates a process 300 of generating identifiers that may indicate attempted changes to registry entries.

The process begins with step 302, in which information about the registry entry is prepared. In order to do this, the data of the original registry entry is obtained. This data is then filtered. The entry may be filtered based on parameters such as the key to which the entry belongs, the value of the entry, the value type of the entry, the value data of the entry, etc. Typically, this is done on a per entry basis. Typically, filtering may be performed using regular expressions, which are strings that are used to describe or match a set of strings, according to certain syntax rules.

In step 304, identifiers relating to the registry entries are packaged. This is done by creating one or more predetermined identifiers based on the filtered entry data. The identifiers are created by hashing the filtered entry data. Hashing is a process of turning data into a relatively small number that may serve as a digital "fingerprint" or identifier of the data. The algorithm "chops and mixes" (i.e., substitutes or transposes) the data to create such fingerprints. The fingerprints are called hash sums, hash values, hash codes or simply hashes. There are a number of well-known hash functions, such as Message Digest algorithm four (MD4) and Message Digest algorithm five (MD5), the Secure Hash Algorithms (SHA), the Research and Development in Advanced Communications Technologies in Europe Integrity Primitives Evaluation Message Digest algorithms (RIPEMD), etc. Any of these or similar functions may be used to generate an identifier based on the filtered registry entry data. As hash functions provide reproducible results, the identifiers produced using hash functions may be compared. A match between such identifiers means a high probability of a match between the data from which the identifiers were produced. Thus, identifiers produced using hash functions provide a way of comparing relatively large amounts of data by comparing the relatively small identifiers generated from the data.

In step 306, it is determined whether there are more entries to be processed. If so, process 300 loops back to step 302, and steps 302-306 are repeated until there are no more entries to be processed. Then the process continues with step 308, in which the identifier package is finalized. Optionally, multiple separate entry identifiers may be used to package new identifiers. For example, a new MD5 identifier may be created based on two other separate MD5 identifiers. In addition, it is desirable to compress the identifiers into a format recognized by the client(s) that will be using the identifiers. The finalized package may then be sent to one or more clients for use in verifying registry entries and/or modifications to registry entries.

A number of additional features may be used to enhance the functionality of the described method and system. For example, it is possible that two separate unique registry entries could produce matching identifiers using a particular hash function. One solution to this is to produce more than one identifier for each entry, using a different hash function for each identifier.

Verification of different identifiers produced using different hash functions may take different amounts of CPU time. Therefore, it is desirable that the method and system accommodate verification of identifiers in any order, so that the identifiers that require less CPU time for verification may be verified first. The order in which identifiers are verified may be dynamically determined, or the order may be specified at some point in the process.

Many registry entries are aliases of each other. For example, the registry entries in HKEY_CLASSES_ROOT may actually be aliases of entries contained in HKEY_LOCAL_MACHINE\SOFTWARE\Classes. It is desirable to distinguish between aliased entries. This includes distinguishing entries based on any combination of the root name, any part of the key path, the value name, the value type, and/or the value data It is also desirable to include match case comparison(s) before, during, and/or after the validation occurs. For example, the entries in HKEY_LOCAL_MACHINE\SOFTWARE\Microsoft\Internet Explorer may equal the entries in HKEY_CURRENT_USER\Software\Microsoft\Internet Explorer. The root names could be removed during the match comparison.

It is also desirable to be able to merge one or more identifiers that have been produced by an individual registry entry with other one or more identifiers produced from other registry entries. This provides the capability to package desirable, or undesirable, entries.

It is also desirable to be able validate one or more of the identifiers using known identifier data, which may be included in data loaded onto the local computer system, or which may be available at a number of web sites, such as MCAFEE® HACKERWATCH®, MCAFEE® SITEADVISOR®, and/or MCAFEE® AntiVirus DAT signatures.

Figure 4:
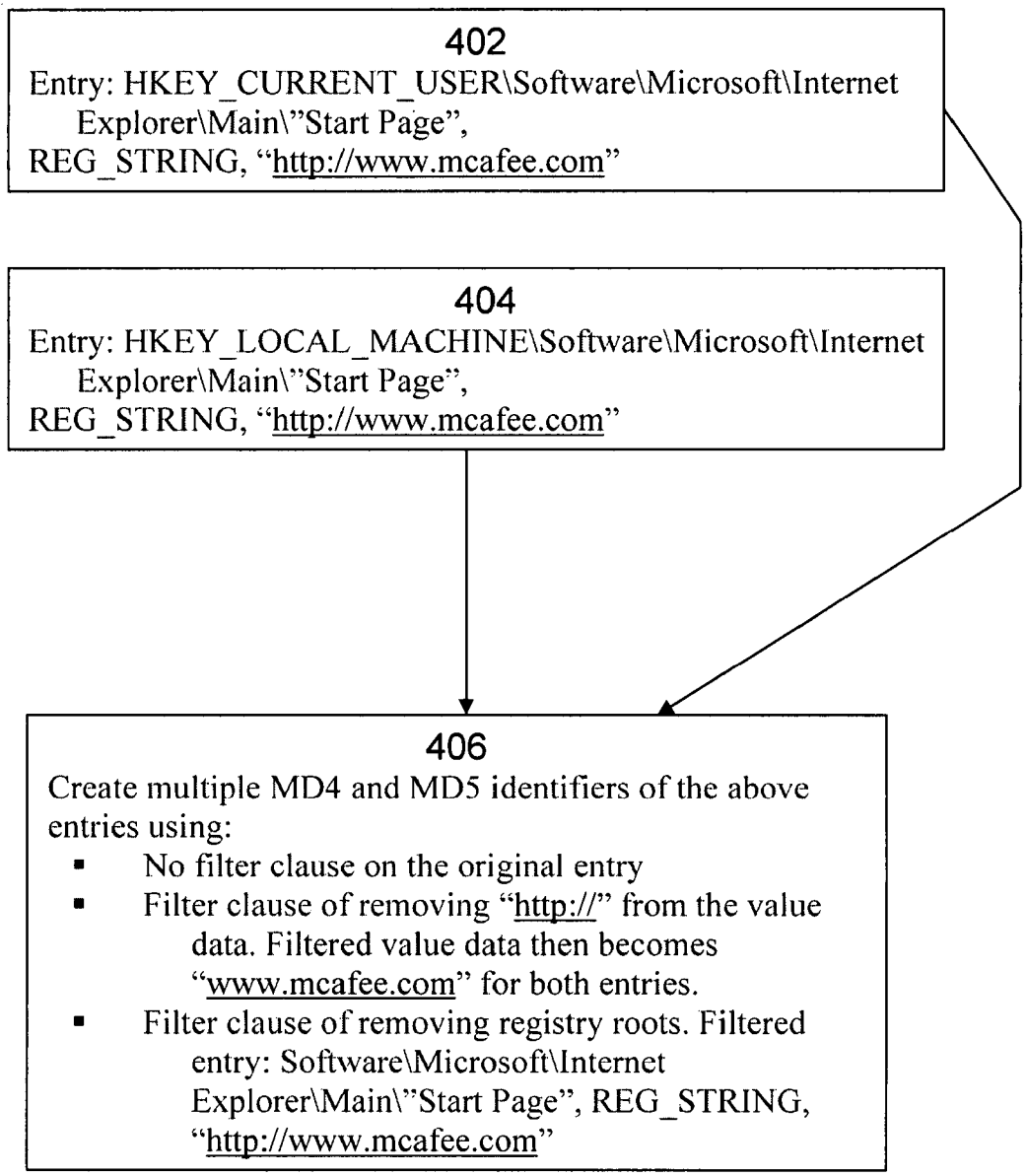
FIG. 4 is an exemplary data flow diagram of processing of registry entries.

An example 400 of processing of registry entries in accordance with process 300 is shown in FIG. 4. In this example, there are two different registry entries 402 and 404 that have the same data value http://www.mcafee.com. These entries are processed 406 to create multiple MD4 and MD5 identifiers using different filtered versions of the registry entries. The filters used include:

No filter clause on the original entry

A filter clause that removes "http://" from the value data. The filtered value data then becomes "www.mcafee.com" for both entries.

A filter clause that removes roots. The filtered entry then becomes: Software\Microsoft\Internet Explorer\Main\"Start Page", REG_STRING, "http://www.mcafee.com"

Figure 5:
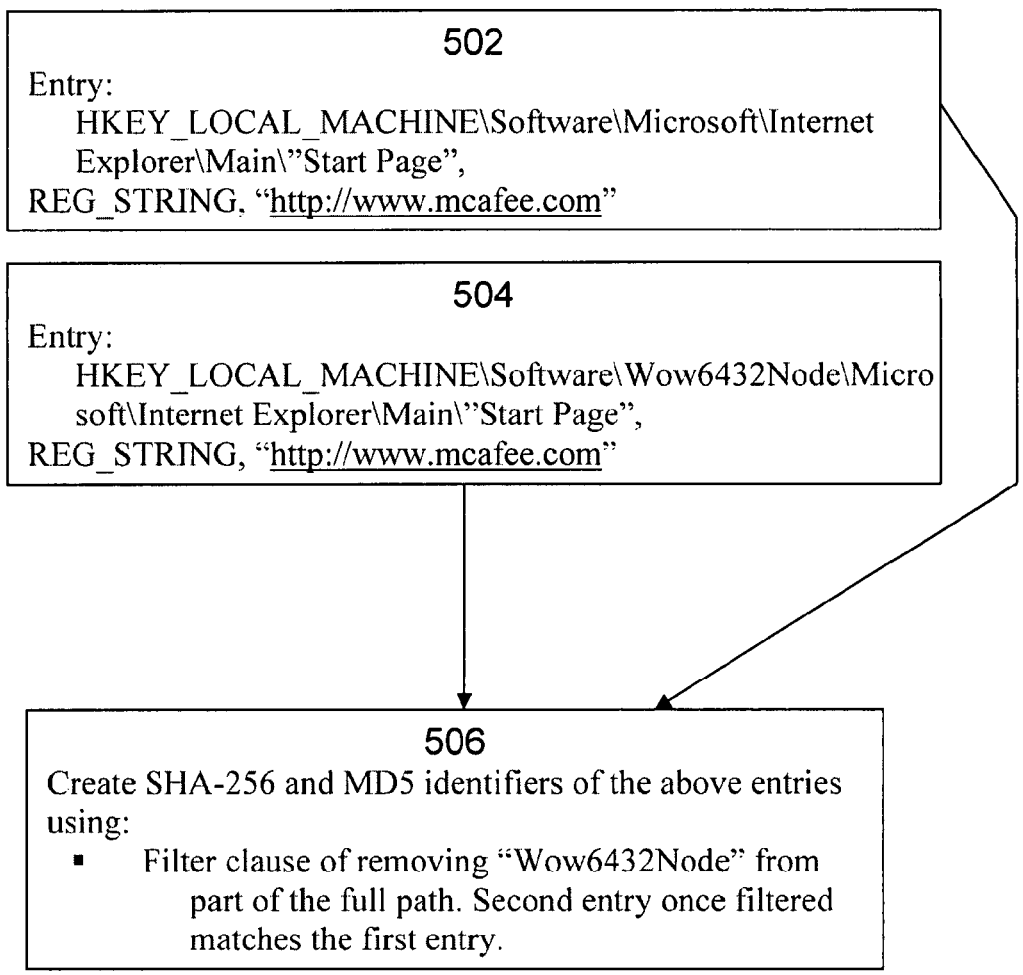
FIG. 5 is an exemplary data flow diagram of processing of registry entries.

An example 500 of processing of registry entries in accordance with process 300 is shown in FIG. 5. In this example, there are two different registry entries 502 and 504 that have the same data value http://www.mcafee.com. These entries are processed 506 create SHA-256 and MD5 identifiers using a filter clause that removes "Wow6432Node" from part of the full path of entry 504. Once filtered, entry 504 matches entry 502.

Figure 6:
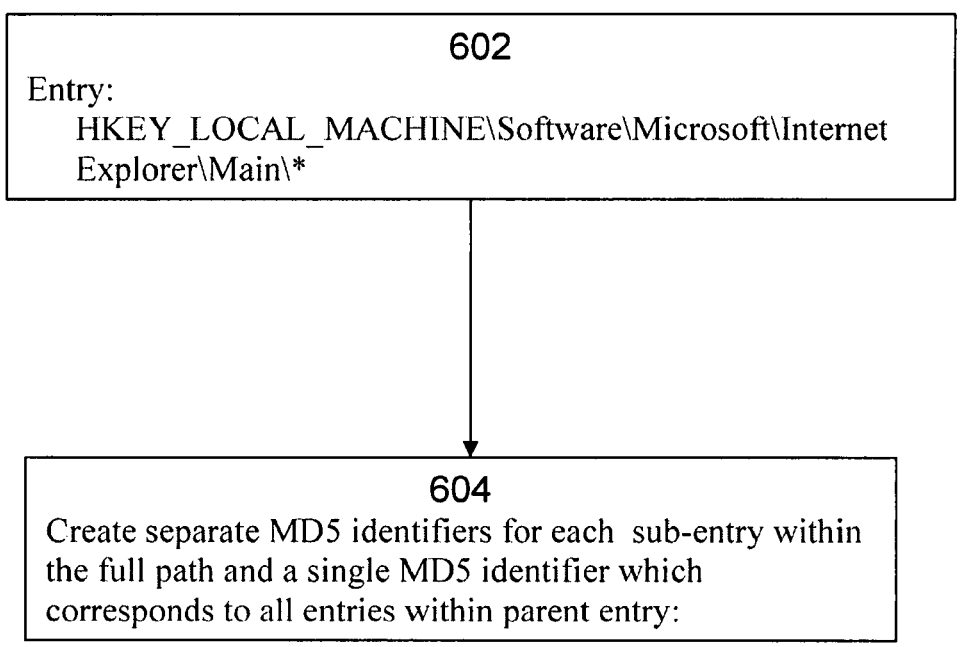
FIG. 6 is an exemplary data flow diagram of processing of registry entries.

An example 600 of processing of registry entries in accordance with process 300 is shown in FIG. 6. In this example, registry entry 602 is a partial path that includes a plurality of registry entries. Entry 602 is processed 604 to create separate MD5 identifiers for each sub-entry within the path. Also, a single MD5 identifier is created that corresponds to all entries within parent entry 602.

Figure 7:
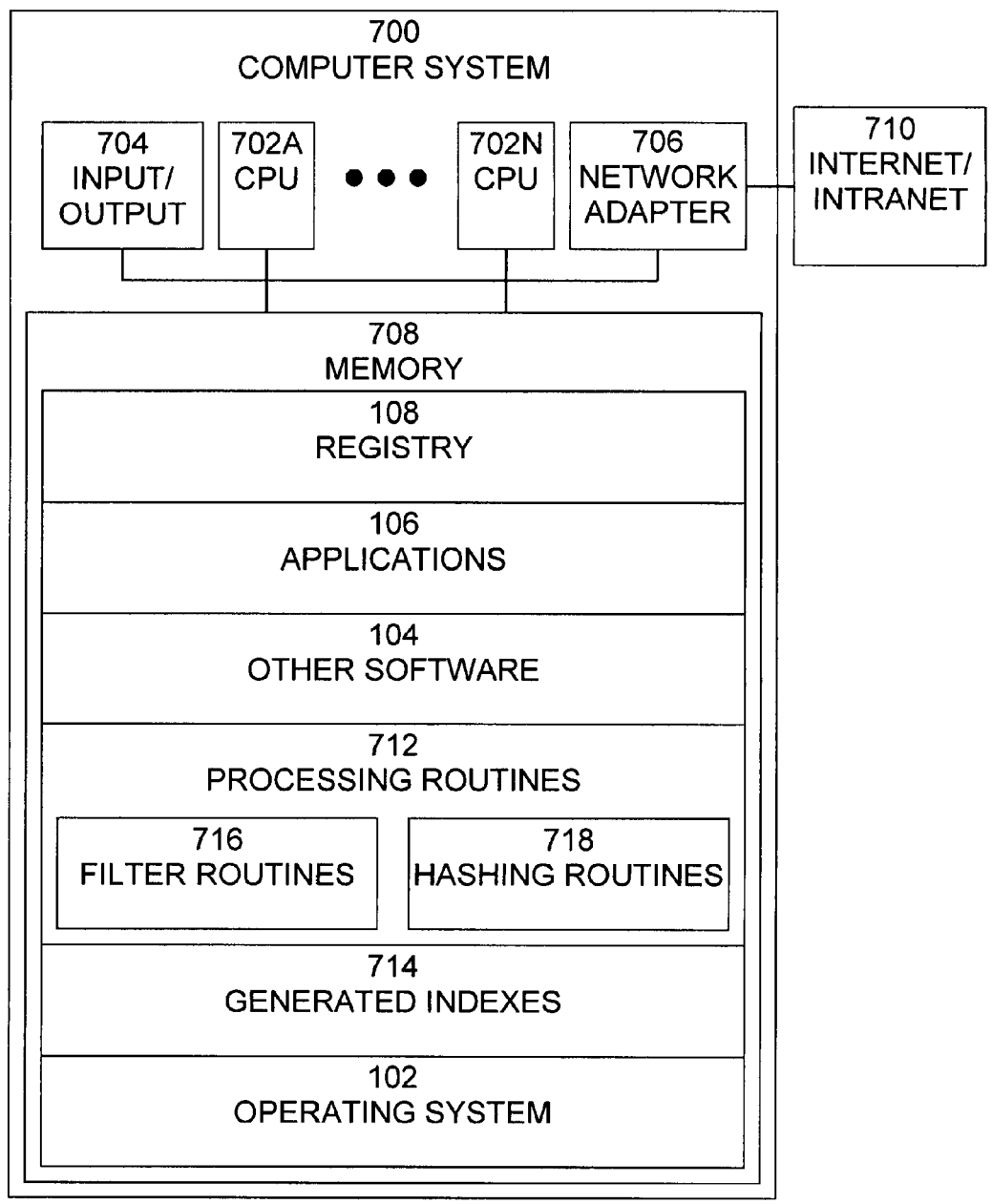
FIG. 7 is an exemplary block diagram of a computer system, in which the present invention may be implemented.

An exemplary block diagram of a computer system 700, in which the present invention may be implemented, is shown in FIG. 7. Computer system 700 is typically a programmed general-purpose computer system, such as a personal computer, workstation, server system, and minicomputer or mainframe computer. Computer system 700 includes one or more processors (CPUs) 702A-702N, input/output circuitry 740, network adapter 706, and memory 708. CPUs 702A-702N execute program instructions in order to carry out the functions of the present invention. Typically, CPUs 702A-702N are one or more microprocessors, such as an INTEL PENTIUM® processor. FIG. 7 illustrates an embodiment in which computer system 700 is implemented as a single multi-processor computer system, in which multiple processors 702A-702N share system resources, such as memory 708, input/output circuitry 704, and network adapter 706. However, the present invention also contemplates embodiments in which computer system 700 is implemented as a plurality of networked computer systems, which may be single-processor computer systems, multi-processor computer systems, or a mix thereof.

Input/output circuitry 704 provides the capability to input data to, or output data from, computer system 700. For example, input/output circuitry may include input devices, such as keyboards, mice, touchpads, trackballs, scanners, etc., output devices, such as video adapters, monitors, printers, etc., and input/output devices, such as, modems, etc. Network adapter 706 interfaces computer system 700 with Internet/intranet 710. Internet/intranet 710 may include one or more standard local area network (LAN) or wide area network (WAN), such as Ethernet, Token Ring, the Internet, or a private or proprietary LAN/WAN.

Memory 708 stores program instructions that are executed by, and data that are used and processed by, CPUs 702A-N to perform the functions of computer system 700. Memory 704 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 708 varies depending upon the function that computer system 700 is programmed to perform. In the example shown in FIG. 7, memory 708 includes registry 108, applications 106, other software 104, processing routines 712, generated indexes 714, and operating system 102. Operating system 102, is the software that manages the sharing of the resources of a computer. An operating system processes system data and user input, and responds by allocating and managing tasks and internal system resources as a service to users and programs of the system. Applications 106A-N are computer software that employs the capabilities of a computer to a task that the user wishes to perform. Typical examples of software applications are word processors, spreadsheets, and media players. Other software 104 includes software other than applications and the operating system and may be intermediate between the applications and operating system, or may operate in conjunction with or next to applications and operating system. Registry 108 a data structure that contains information and settings for all the hardware and operating system software, as well as information and settings for most non-operating system software, users, preferences of the PC, etc. Processing routines 712 are software routines that implement the registry processing described above, such as that shown in FIG. 3. Processing routines 712 include filter routines 716 and hashing routines. Filter routines 714 filter registry entries, for example, based on parameters such as the key to which the entry belongs, the value of the entry, the value type of the entry, the value data of the entry, etc. Typically, this is done on a per entry basis. Typically, filtering may be performed using regular expressions, which are strings that are used to describe or match a set of strings, according to certain syntax rules. Hashing routines 718 generate one or more predetermined identifiers based on the filtered entry data. The identifiers are created by hashing the filtered entry data. Operating system 102 provides overall system functionality.

As shown in FIG. 7, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, LINUX®, and WINDOWS®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include storage media, examples of which include, but are not limited to, floppy disks, hard disk drives, CD-ROMs, DVD-ROMs, RAM, and, flash memory, as well as transmission media, examples of which include, but are not limited to, digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. At least one non-transitory computer-readable medium comprising one or more instructions that when executed by a processor:
   prepare entry data of a registry entry for a computer system;
   create one or more identifiers based on the entry data, wherein the one or more identifiers indicate an attempted change to a registry of the computer system;
   package the one or more identifiers;
   send the packaged one or more identifiers to a client for verification, wherein the client comprises software configured to process the one or more identifiers in order to determine whether the registry entry is authorized and whether the registry entry is associated with data that is free from malware,
   wherein the one or more identifiers are merged with at least one other identifier of a different registry entry in order to package the one or more identifiers and the at least one other identifier as either desirable or undesirable registry entries.

2. The at least one non-transitory computer-readable medium of claim 1, comprising one or more further instructions that when executed by a processor:
   provide known identifier data to the client to validate a plurality of particular identifiers.

3. The at least one non-transitory computer-readable medium of claim 1, wherein each of the one or more identifiers is created by a different hash function.

4. The at least one non-transitory computer-readable medium of claim 1, wherein the one or more identifiers are created by a hashing activity.

5. The at least one non-transitory computer-readable medium of claim 4, wherein the entry data comprises a first portion identifying the registry entry and a second portion including a value of the registry entry, and wherein the hashing activity is configured to:
   hash the first portion of the entry data and the second portion of the entry data.

6. The at least one non-transitory computer-readable medium of claim 5, wherein the first portion is filtered when the entry data is prepared.

7. The at least one non-transitory computer-readable medium of claim 1, wherein each of the one or more other identifiers is created for a sub-entry of a partial path of the registry entry.

8. A method for verifying changes to a registry in a computer system comprising:
   preparing entry data of a registry entry for a computer system;
   creating one or more identifiers based on the entry data, wherein the one or more identifiers indicate an attempted change to a registry of the computer system;
   packaging the one or more identifiers;
   sending the packaged one or more identifiers to a client for verification, wherein the client comprises software configured to process the one or more identifiers in order to determine whether the registry entry is authorized and whether the registry entry is associated with data that is free from malware,
   wherein the one or more identifiers are merged with at least one other identifier of a different registry entry in order to package the one or more identifiers and the at least one other identifier as either desirable or undesirable registry entries.

9. The method of claim 8, wherein the one or more identifiers are created by a hashing activity.

10. The method of claim 9, wherein the entry data comprises a first portion identifying the registry entry and a second portion including a value of the registry entry, and wherein the hashing activity includes:
    hashing the first portion of the entry data and the second portion of the entry data.

11. The method of claim 10, wherein the preparing the entry data includes filtering the first portion.

12. A system for verifying changes to a registry in a computer system, comprising:
    a memory configured to store data;
    a processor configured to execute instructions associated with the data, wherein the instructions, when executed by the processor:
    prepare entry data of a registry entry for a computer system;
    create one or more identifiers based on the entry data, wherein the one or more identifiers indicate an attempted change to a registry of the computer system;
    package the one or more identifiers;
    send the packaged one or more identifiers to a client for verification, wherein the client comprises software configured to process the one or more identifiers in order to determine whether the registry entry is authorized and whether the registry entry is associated with data that is free from malware,
    wherein the one or more identifiers are merged with at least one other identifier of a different registry entry in order to package the one or more identifiers and the at least one other identifier as either desirable or undesirable registry entries.

13. The system of claim 12, wherein each of the one or more identifiers is created by a different hash function.

14. The system of claim 12, wherein the one or more identifiers are created by a hashing activity.

15. The system of claim 14, wherein the entry data comprises a first portion identifying the registry entry and a second portion including a value of the registry entry, and wherein the hashing activity is configured to:
    hash the first portion of the entry data and the second portion of the entry data.

16. The system of claim 15, wherein the first portion is filtered when the entry data is prepared.

17. The system of claim 12, wherein each of the one or more other identifiers is created for a sub-entry of a partial path of the registry entry.

18. The at least one non-transitory computer-readable medium of claim 1, wherein the attempted change is prevented when the registry entry is not authorized.

19. The method of claim 8, wherein the attempted change is prevented when the registry entry is not authorized.

20. The system of claim 12, wherein the attempted change is prevented when the registry entry is not authorized.

* * * * *